United States Patent [19]
Kim et al.

[11] Patent Number: 6,024,380
[45] Date of Patent: Feb. 15, 2000

[54] AIRBAGS AND PROCESS OF PREPARATION

[75] Inventors: Kwang Oh Kim; Sang Mok Lee, both of KyungSangBuk-Do, Rep. of Korea

[73] Assignee: Kolon Industries, Inc., Kyunggi-do, Rep. of Korea

[21] Appl. No.: 08/999,331

[22] Filed: Dec. 29, 1997

[30] Foreign Application Priority Data

Dec. 26, 1996 [KR] Rep. of Korea ......... 96-72246
Sep. 23, 1997 [KR] Rep. of Korea ......... 97-48219

[51] Int. Cl.$^7$ ................................. B60R 21/16
[52] U.S. Cl. ................ 280/743.1; 280/728.1; 280/739
[58] Field of Search ............... 280/743.1, 728.1, 280/739

[56] References Cited

U.S. PATENT DOCUMENTS

| | | | |
|---|---|---|---|
| 5,073,418 | 12/1991 | Thornton et al. | 280/743.1 |
| 5,131,434 | 7/1992 | Krummheuer et al. | 280/743.1 |
| 5,361,808 | 11/1994 | Bowen, Jr. . | |
| 5,542,703 | 8/1996 | Beasley | 280/739 |
| 5,637,114 | 6/1997 | Hohnke | 280/728.1 |
| 5,672,188 | 9/1997 | Choi . | |
| 5,855,393 | 1/1999 | Keshavaraj | 280/743.1 |
| 5,865,464 | 2/1999 | Kanuma et al. | 280/743.1 |
| 5,881,776 | 1/1999 | Beasley, Jr. | 280/728.1 |

FOREIGN PATENT DOCUMENTS 6-87394  3/1994  Japan ............ 280/743.1

*Primary Examiner*—Paul N. Dickson
*Assistant Examiner*—Lynda Jasmin
*Attorney, Agent, or Firm*—Oblon, Spivak, McClelland, Maier & Neustadt, P.C.

[57] ABSTRACT

An airbag is prepared by:

(a) providing a woven fabric by weaving polyamide filament of the same density in the warp and weft directions;

(b) forming a low air permeability fabric by heat-setting the above woven fabric at a temperature less than 180° C.;

(c) forming a high air permeability fabric by heat-setting the above woven fabric at 190° C.–220° C.; and (d) sewing the high and low air permeability fabric together after locating the low air permeability fabric as the front panel, and the high air permeability fabric as the back panel.

7 Claims, 1 Drawing Sheet

AIRBAGS AND PROCESS OF PREPARATION

BACKGROUND OF THE INVENTION

1. Field of the Invention

The present invention relates to an airbag, to a process of preparing the airbag and to a method of protecting vehicle occupants from unexpected peril during vehicular collision.

2. Description of the Background

A practical trend is to use an airbag system along with seat belts in the construction of current transportation means, especially in automobiles for the purpose of protecting passengers from vehicular collision and its accompanying shock. Since the airbag system is usually installed in the handles or in dashboards of automobiles, the smaller the volume of the airbag, the better. Also, the airbag must have excellent heat-resistance and abrasion-resistance, since it sustains high temperatures and repeated vibrations of the vehicle over a long period of time.

An airbag is structured of a front panel, the driver side panel, the back panel, and the inflator side panel. An inflator adherent hole is positioned in the back panel, and a vent hole can be formed where desired. An inflator adherent hole is a hole by which high-pressure gas is injected into the airbag, and the vent hole is a hole through which high-pressure gas is exhausted from the airbag for the purpose of impact alleviation and suffocation prevention.

In the event of a traffic accident, airbags are required to exhibit several specific properties which include compactness, strength, flexibility and lightness in weight to protect the heads and bodies of passengers. When it comes to an accident, high temperature and high pressure gas from an inflator inflates the airbag in order to protect passengers from any peril. High temperature and high pressure gas generated by the inflator come into contact with the fabric of airbag and the airbag expands. If the airbag fabric is not compact enough, the high temperature and high pressure gas will leakout of the airbag and then touch the human body which may directly cause harmful effects such as suffocation.

The compactness of the airbag fabric is a desirable characteristic. The airbag should have an air permeability less than 0.5 cc/[cm$^3$·second] measured under a 1.27 cm H$_2$O pressure difference.

The airbag also needs to exhibit superior tensile strength upon rapid expansion as it is inflated by high temperature and high pressure gas. The tensile strength should be greater than 181 kg/inch, when it is measured by the ASTM D 5034 method. Furthermore, the airbag fabric should have good flexibility and be light in weight in order to increase the efficiency of installation in a module and for lightness of the vehicle. Desirably, the thickness of the airbag fabric should be less than 0.04 cm and the weight of airbag fabric should be less than 250 g/m$^2$.

Prior art methods of producing fabric for airbags which attempt to satisfy the specific requirements described above are described below.

Japanese Published Patent No. 64-41438 discloses a method of producing airbag fabric using a synthetic filament, whose monofilament denier is less than 3 denier and whose total denier is 840 denier. The monofilament is used in the warp and weft, as the airbag fabric is woven to a warp and weft density of 24 ends/inch. A rubber coating is then applied to the airbag fabric surface.

The coating of an airbag fabric with materials such as chloroprene, neoprene or silicon rubber may improve the compactness of the fabric and the efficiency of hot wind cut-off. Unfortunately, however, the process of production is very complicated and the cost of production consequently increases along with the troublesome problem of re-cycling of airbag fabric. If the compactness of the fabric is too high, there is the additional annoying problem of installing a vent hole in back panel which exhausts high-pressure gas injected into airbag for the sake of alleviating impact and preventing suffocation of driver and occupant.

Japanese Published Patent No. 6-306728 discloses an effort to overcome the problems noted above which result from coating a fabric. Here, some synthetic filament is employed in the warp and the weft which has more than 20 texturing knobs per meter. The denier of the monofilament ranges from 0.6–3.0 denier for the weaving of the airbag fabric. To prevent filling of the warp during weaving, the synthetic filament is textured. This process of preparation, however, has the problem that the compactness of the airbag fabric deteriorates.

Korean Patent Publication No. 92-16632, describes a process of preparing a high-density fabric that uses a synthetic filament, wherein its monofilament denier ranges from about 3.5 to about 4.5 dtex. The fabric has no texturing in the warp and the weft. Though by this process it is possible to improve the compactness of airbag fabric, it is not possible practically to weave a high-density airbag because of filling in the warp during weaving.

In order to eliminate the problem of filling in the warp direction when synthetic filament is used for the warp and the weft, it has been suggested size the warp prior to weaving. This method, however, may result in such problems as increasing the flammability of the fabric and deterioration of several characteristics of the fabric because of the breeding infestation of germs which occurs upon long term storage of the fabric, which bacterial problems result if the fabric is not rid of sizing agent by washing after weaving.

For the purpose of solving the above problems which are incurred during sizing of the warp, it has been suggested to adopt a filament as the warp which has a thicker denier of monofilaments than that of the weft instead of sizing the warp.

Once an airbag is made of uncoated fabric, which has been prepared by the methods described above, the air permeabilities of the back panel and the front panel are likely to be equal. If no vent hole is formed in the back panel of the airbag for the purpose of exhausting high-pressure gas from the airbag, the driver or occupants of a car may be heat injured from the ejected high-pressure gas of the airbag, which is discharged evenly through the back panel, and the front panel. Consequently, there is the troublesome necessity of forming a vent hole in the back panel, if the back panel and the front panel of the airbag are made of uncoated fabric which has the same air permeability.

In order to eliminate the troublesome necessity of forming a vent hole in the back panel of the airbag, when the airbag is made of uncoated fabric, Japanese Published Patent No. 4-281038 describes the following:

a) Prepare fabrics which vary in density by utilizing jacard or the like.

b) Locate low density fabric on the back panel and high density fabric on the front panel for airbag sewing.

This method has the problem of locating a low density part fabric in the airbag as the back panel, which does not satisfy the strength required of an airbag.

Japanese Published Patent No. 3-27146 and 3-27147 teaches that the air permeability of the front panel is less than that of the back panel of an airbag, wherein the fabric for the airbag is prepared by a Tubular Weave. The fabric is then used as it is in the back panel or the side panel, but it is only used for the front panel after calendering. This method has the problems of complicating the airbag preparation process because of the Tubular Weave and the calendering treatment.

SUMMARY OF THE INVENTION

Accordingly, one object of the present invention is to provide an uncoated airbag, which is simple to manufacture, thereby minimizing production costs, and which exhibits compactness, is light in weight, strength and flexibility and which does not require a vent hole in the back panel.

Briefly, this object and other objects of the present invention as hereinafter will become more readily apparent can be attained by a process of preparing airbags by:

(a) providing a woven fabric by weaving polyamide filament of the same density in the warp and weft directions;

(b) forming a low air permeability fabric by heat-setting the above woven fabric at a temperature less than 180° C.;

(c) forming a high air permeability fabric by heat-setting the above woven fabric at 190° C.~220° C.; and (d) sewing the high and low air permeability fabric together after locating the low air permeability fabric as the front panel, and the high air permeability fabric as the back panel.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

The FIGURE shows an embodiment of the airbag of the invention.

DETAILED DESCRIPTION OF THE PREFERRED EMBODIMENTS

Figure 1:
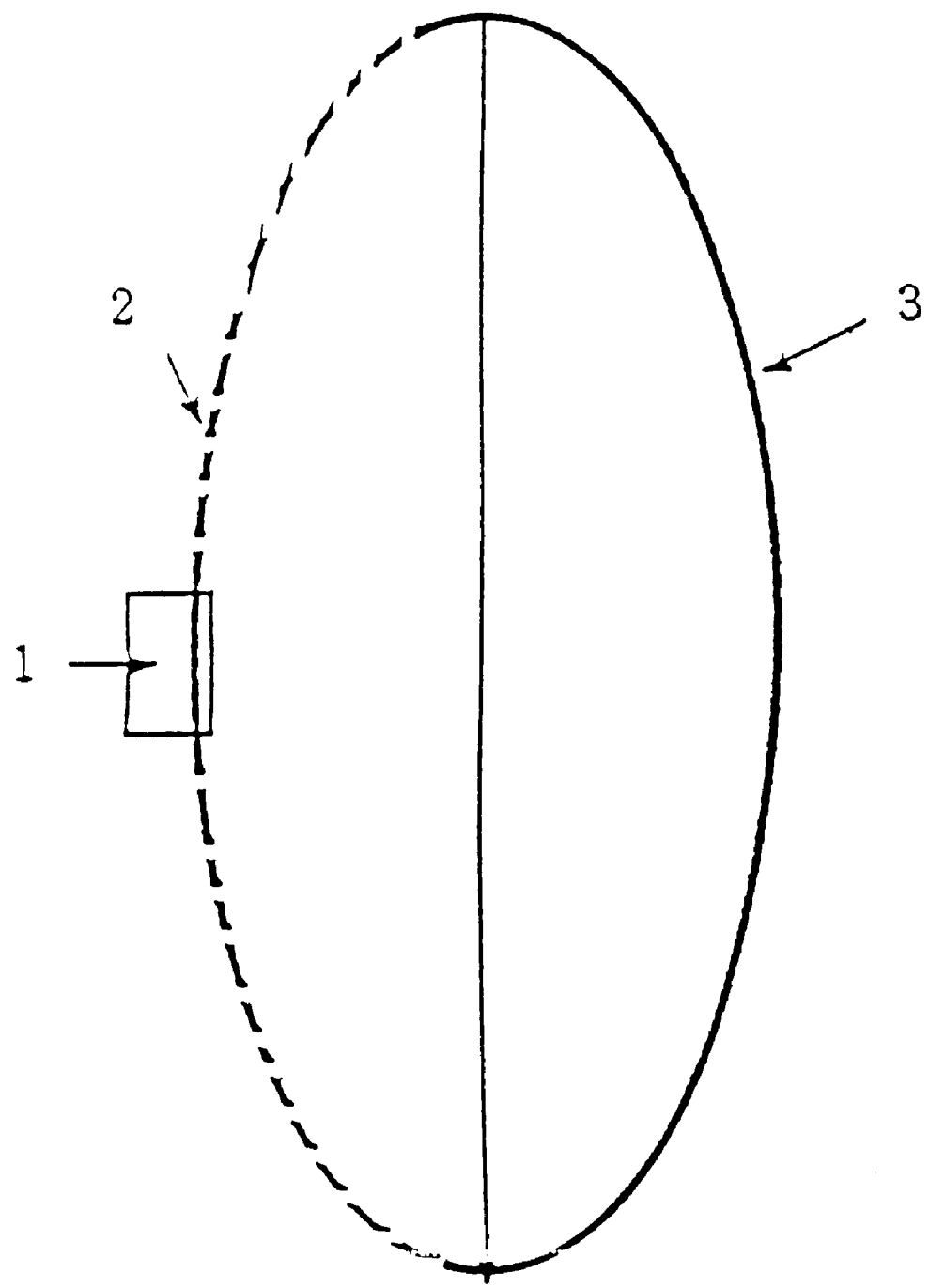

The airbag of the present invention solves the problems related to coated airbags such as complicated processing, expensive production costs, difficulty of re-cycling and the requirement of the formation of a vent hole in the back panel. The present airbag provides protection for vehicle occupants from unexpected peril during vehicular collision.

Generally, in operation, an airbag is inflated by high temperature and high pressure gas discharged from inflator (1). The rapidly inflated airbag protects the driver and other occupants of a car during an unexpected accident such as an automobile collision.

Most of vehicle airbags currently used have a vent hole formed in the rear panel of the airbag in order to enable the exhausting of high pressure and high temperature gas. The venting of gas through the hole prevents the driver and/or passenger from suffocating from over-pressure of the inflated airbag. A distinct advantage of the present airbag is that it does not require a rear vent hole, because the back panel fabric ventilates better than the front panel fabric.

In the process of preparing the present airbag, first of all, high air permeability fabric is prepared by heat-setting a fabric which has been woven of polyamide filament in the warp and weft directions at 190~220° C. This high air permeability fabric is used for back panel (2) of the airbag. If the heat-setting temperature is less than the above range, fabric ventilation will deteriorate. If the heat-setting temperature is greater than the range of the present invention, the strength of fabric will deteriorate.

Suitable polyamide fabrics used in the present invention include polyamide 66, polyamide 6, and polyamide 46. The preferred denier of the filament from which the fabric is woven ranges from 210–840, but there is no special restriction of the denier of the filament. These fabrics are woven in a Plain Weave, Basket Weave or Twill Weave manner.

High air permeability fabrics, which are used for the back panel of the airbag, come into direct contact with high temperature and high pressure gas injected into the airbag inflator. The high temperature and high pressure gas is exhausted from the airbag through the high air permeability fabric after airbag inflation. At this moment, the high air permeability fabric cools the high temperature and high pressure gas and filtrate dust occurred during inflator (1) blow up for preventing leaked out of gas and explosion residue to inside the vehicle.

In order to achieve desired airbag capability, the high air permeability fabric is heat-set at a high temperature of 190~220° C., and the air permeability of fabric, measured under 50 kPa of experimental pressure, is more than 300 ft$^3$/ft$^2$·minute (hereinafter called "CFM").

In order to prevent rupture of the airbag fabric because of contact with the high temperature and high pressure gas, the tensile strength of the high air permeability fabric should be more than 181 kg/inch. Furthermore, for better flexibility and light-weightness, the desired thickness and weight of the high air permeability fabric should be less than 0.04 cm, and 250 g/m$^2$, respectively.

Secondly, the low air permeability fabric is prepared by heat-setting of the fabric at a temperature less than 180° C. This fabric is woven at the same density of the high air permeability fabric, using polyamide filament as the warp and the weft. If the heat-setting temperature exceeds the temperature range of the present invention, fabric ventilation improves, but the strength of the fabric would be deteriorates. This low air permeability fabric constitutes the front panel of the present airbag.

Suitable polyamide fabrics used to prepare the front panel include polyamide 66, polyamide 6, and polyamide 46. The preferred denier of the filament used to prepare the front panel range from 210–840, but there are no special restrictions on the denier of the filament. These fabrics are woven in Plain Weave, Basket Weave or Twill Weave manner.

Also upon weaving, if a filament is used, whose monofilament denier is greater than 6 denier, in the warp direction, and a filament is used, whose monofilament denier is less than 6 denier in the weft direction, not only the compactness of the fabric is improved, but the weaving productivity is increased without sizing of the warp. By preparing a woven fabric in this manner, the scouring temperature can be lowered during the scouring process, the amount of scouring chemicals used can be reduced, and the scouring time can be shortened.

This low air permeability fabric is applied as the front panel of the airbag, and should prevent scalding or suffocation of the driver and occupants of a vehicle by the high temperature and pressure gas which leaks from the airbag when inflator (1) injects the high temperature and high pressure gas into the airbag. In order to provide this capability sufficiently, the low air permeability fabric of the present invention is heat set at a relatively low temperature such as below 180° C., and the air permeability of the fabric, measured under 50 kPa of experimental pressure, is less than 200 CFM.

In order to prevent rupture of the airbag fabric as a result of contact of the fabric with the high temperature and high pressure gas, the tensile strength of the low air permeability fabric should be greater than 181 kg/inch. Furthermore, for better flexibility and light-weightness, the preferred thickness and weight of the high-ventilating fabric should be less than 0.04 cm, and 250 g/m², respectively.

The production of an airbag of the present invention from high air permeability and low air permeability fabrics is as follows. The airbag is produced by sewing low air permeability fabric, as the front panel (3), to high air permeability fabric as the back panel (2), as shown in the Figure. Upon inflation of the airbag, inflator (1) injects high temperature-pressure gas into the airbag.

The airbag of present invention is composed of two thermoplastic fabrics which have different air permeabilities measured under a 50 kPa pressure difference (ΔP). The air permeability of the low-ventilating fabric which constitutes the front panel (3) is less than 200 CFM, and the high-ventilating fabric which constitutes the back panel or the side panel is more than 300 CFM. The tensile strengths of both fabrics are more than 181 Kg/inch.

Air permeability is one of the most important properties of an automobile airbag fabric. Air permeability is measured by the speed of air passing through a fabric utilizing a given pressure difference on the fabric at both ends.

A commonly used experimental standard pressure difference is 98–2,500 Pa. But a practical pressure which affects the fabric during airbag inflation is about 40~60 kPa. Even though fabrics may exhibit similar air permeabilities at commonly used experimental pressure differences, the fabrics may exhibit some difference in air permeability upon airbag inflation, because the air permeability of the fabric is not always in direct proportion to changes in the measurement of pressure difference.

In the present invention, therefore, air permeability is measured at a 50 kPa pressure difference, because 50 kPa is the median value of the actual useful pressure range of 40–60 kPa employed for the inflation of the airbag.

The airbag of the present invention does not have to have a vent hole, since the air permeability of the back panel fabric is high. Because of this high air permeability, upon inflation of the airbag under emergency conditions, the airbag will relatively rapidly deflate, thereby preventing scalding and/or suffocation of the occupant(s) of the vehicle being protected. Also, the airbag of the present invention solves the problems associated with coating an airbag, which are complicated processing, expensive production costs, difficulty of re-cycling, and the formation of a vent hole. At the same time, the airbag of the present invention solves the problems of uncoated airbags which are the necessity of forming a vent hole in the fabric in case the compactness of fabric is too high, and the danger of scalding the driver or other occupants of the vehicle if the compactness of the fabric is too low.

Having generally described this invention, a further understanding can be obtained by reference to certain specific examples which are provided herein for purposes of illustration only and are not intended to be limiting unless otherwise specified.

EXAMPLE 1

A fabric is woven from filaments of polyamide 66, whose monofilament denier is 6 denier, and whose total filament denier is 420 denier in the warp and weft directions. The woven fabric has a density in the warp and weft of 50 ends X 50 picks/inch in a plain weave.

A high air permeability fabric whose density in the warp and weft is 52 ends X 52 picks/inch is prepared by heat-setting the woven fabric at 195° C. Also, a low air permeability fabric which density in the warp and weft is 52 ends×52 picks/inch, is prepared by heat-setting the woven fabric at 170° C.

After positioning the high air permeability fabric as the back panel of an airbag, and the low air per permeability fabric as the front panel of the airbag, the two panels are sewn together, thus manufacturing an airbag. Properties such as air permeability, tensile strength and others of the manufactured airbag are shown in Table 1.

EXAMPLE 2

A fabric is woven from filaments of polyamide 66, whose monofilament denier is 6 denier, and whose total denier is 420 denier in the warp and weft. The woven fabric has a density in the of warp and weft of 50 ends×50 picks/inch in a plain weave. A high air permeability fabric, which has a density in the warp and weft of 52 ends×52 picks/inch, is prepared by heat-setting the woven fabric at 195° C.

Filaments of polyamide 66, whose monofilament denier is 6.2 denier, and whose total denier is 420 denier are chosen for the warp. Filaments of polyamide 66, whose monofilament denier is 3.1 denier, and whose total denier is 420 denier are selected from the weft. A fabric is woven from these filaments having a density in the warp and weft of 50 ends×50 picks/inch in a plain weave. A low air permeability fabric, whose density in the warp and weft is 52 ends×52 picks/inch, is prepared by heat-setting the woven fabric at 170° C.

After positioning the high air permeability fabric as the back panel of an airbag, and the low air permeability fabric as the front panel of an airbag, the two panels are sewn together, thereby manufacturing the airbag. Properties such as air permeability, tensile strength and others of the manufactured airbag are shown as Table 1.

EXAMPLE 3

A fabric is woven from filaments of polyamide 66, whose monofilament denier is 6 denier, and whose total denier is 630 denier in the warp and weft. The woven fabric has a density in the warp and weft of 39 ends x 39 picks/inch in a plain weave. A high air permeability fabric, whose density in the warp and weft of 41 ends×41 picks/inch, is prepared by heat-setting the woven fabric at 195° C. Moreover, a low air permeability fabric, whose density in the warp and weft is 41 ends×41 picks/inch, is prepared by heat-setting the woven fabric at 170° C.

After positioning the high air permeability fabric as the back panel of an airbag, and the low air permeability fabric as the front panel for the airbag, the two panels are sewn together, thereby manufacturing the airbag. Properties such as air permeability, tensile strength and others of the manufactured airbag are shown in Table 1.

COMPARATIVE EXAMPLE 1

A fabric is woven from filaments of polyamide 66, whose monofilament denier is 6 denier, and whose total denier is 420 denier in the warp and weft. The weave fabric has a density in the warp and weft of 54 ends×54 picks/inch in a plain weave. This fabric is directly used as a low air permeability fabric.

A fabric is woven from filaments of polyamide 66, whose monofilament denier is 6 denier, and whose total denier is 420 denier in the warp and weft. The woven fabric has a density in the warp and weft of 41 ends x 41 picks/inch in a plain weave. The fabric is directly used as a high air permeability fabric.

After positioning the high air permeability fabric as the back panel of an airbag, and the low air permeability fabric as the front panel of the airbag, the panels are sewn together, thereby manufacturing an airbag, Properties such as air permeability, tensile strength and others of the manufactured airbag are shown as Table 1.

COMPARATIVE EXAMPLE 2

A fabric is woven from filaments of polyamide 66, whose monofilament denier is 6 denier, and whose total denier is 420 denier in the warp and weft. The woven fabric has a density in the warp and weft of 50 ends×50 picks/inch in a plain weave.

A high air permeability fabric, which has a density in the warp and weft of 52 ends×52 picks/inch, is prepared by heat-setting the woven fabric at 230° C. A low air permeability fabric, which has a density in the warp and weft of 52 ends×52 picks/end, is also prepared by heat-setting the woven fabric at 182° C.

After positioning the high air permeability fabric as the back panel of an airbag, and the low air permeability fabric as the front panel of the airbag, the two panels are sewn together, thereby manufacturing the airbag. Properties such as air permeability, tensile strength and others of the manufactured airbag are shown as Table 1.

COMPARATIVE EXAMPLE 3

A fabric is woven from filaments of polyamide 66, whose monofilament denier is 6 denier, and whose total denier is 630 denier in the warp and weft. The woven fabric has a density in the warp and weft of 39 ends×39 picks/inch in a plain weave.

A high air permeability fabric, which has a density in the warp and weft of 41 ends×41 picks/inch, is prepared by heat-setting the woven fabric at 230° C. A low air permeability fabric, which has a density in the warp and weft of 41 ends×41 picks/end, is also prepared by heat-setting the woven fabric at 182° C.

After positioning the high air permeability fabric as the back panel of an airbag, and the low air permeability fabric as the front panel of the airbag, the two panels are sewn together, thereby manufacturing the airbag. Properties such as air permeability, tensile strength and others of the manufactured airbag are shown as Table 1.

TABLE 1

|  | TOTAL DENIER | WARP & WEFT DENSITY (ENDS/INCH) | | AIR PERMEABILITY (CPM) | | THICKNESS (cm) | | TENSILE STRENGTH (Kg/INCH) | |
| --- | --- | --- | --- | --- | --- | --- | --- | --- | --- |
|  |  | LOW-VENT. | HIGH-VENT. | LOW-VENT. | HIGH-VENT. | LOW-VENT. | HIGH-VENT. | LOW-VENT. | HIGH-VENT. |
| EXAMPLE 1 | 420 | 52 | 52 | 162 | 310 | 0.034 | 0.034 | 245 | 243 |
| EXAMPLE 2 | 420 | 52 | 52 | 107 | 310 | 0.034 | 0.034 | 249 | 243 |
| EXAMPLE 3 | 630 | 41 | 41 | 175 | 380 | 0.037 | 0.037 | 269 | 265 |
| COMP. EXAM. 1 | 420 | 54 | 41 | 205 | 290 | 0.036 | 0.033 | 251 | 172 |
| COMP. EXAM. 2 | 420 | 52 | 52 | 162 | 376 | 0.034 | 0.034 | 245 | 176 |
| COMP. EXAM. 3 | 630 | 41 | 41 | 210 | 420 | 0.037 | 0.037 | 269 | 179 |

*Low-vent means low air permeability fabric.
**High-vent means high air permeability fabric.

As is clear from the data above for Example 1–3, although the densities and tensile strengths of the high air permeability fabrics of the back panel or the side panel, and the low air permeability fabrics of the front panel are of the same level, compactness and exhaust effects can be achieved because of the air permeability difference. As for the high air permeability fabric, it also has a superior module receptivity, because of its low stiffness.

As for Comparative Example 1, although the exhaust effect of the airbag, based on the low density high permeability fabric employed as the back panel, is excellent, the airbags strength shows significant deterioration and, therefore, the performance of the airbag will consequently deteriorate.

In Comparative Example 2 and Comparative Example 3, the strength of the fabric will deteriorate, because the heat-set temperature employed for preparing the high air permeability fabric is too high.

Korean Patent Applications Nos. 72246/96 and 48219/97 filed Dec. 26, 1996 and Sep. 23, 1997, respectively are hereby incorporated by reference into the present application.

Obviously, numerous modifications and variations of the present invention are possible in light of the above teachings. It is, therefore, to be understood that within the scope of the appended claims, the invention may be practiced otherwise than as specifically described herein.

What is claimed as new and is desired to be secured by Letters Patent of the United States is:

1. A process of preparing airbags, comprising the following steps:

(a) providing a woven fabric by weaving polyamide filament of the same density in the warp and weft directions;

(b) forming a low air permeability fabric by heat-setting the above woven fabric at a temperature less than 180° C.;

(c) forming a high air permeability fabric by heat-setting the above woven fabric at 190° C.–220° C.; and (d) sewing the high and low air permeability fabric together after locating the low air permeability fabric as the front panel, and the high air permeability fabric as the back panel.

2. The process according to claim 1, wherein said fabric has a polyamide filament denier ranging from 210–840 denier.

3. The process according to claim 1, wherein said polyamide filament is formed from a resin selected from the group consisting of polyamide 6, polyamide 66, and polyamide 46.

4. The process according to claim 1, wherein said low air permeability fabric is such that the denier of the monofilaments of the weft is smaller than the denier of the monofilament of the warp.

5. The process according to claim 1, wherein the thickness of the high air permeability fabric is less than 0.04 cm.

6. The process according to claim 1, wherein the weight of the high air permeability is less than 250 g/cm$^2$.

7. An airbag comprising:

two polyamide fabrics which have different air permeabilities measured under a 50 kPa pressure difference ($\Delta P$), one of which, as the front panel of the airbag, is a low air permeable fabric prepared by heat-setting the fabric of the panel at a temperature <180° C. and having a permeability less than 200 CFM, while the other, as the back panel of the airbag, is a high air permeable fabric prepared by heat-setting the fabric of the panel at a temperature of 190–220° C. and having a permeability of greater than 300 CFM, each fabric having a tensile strength greater than 181 Kg/inch.

* * * * *